United States Patent [19]

Dunn

[11] 4,406,127
[45] Sep. 27, 1983

[54] INTERNAL COMBUSTION ENGINE WITH STEAM POWER ASSIST

[76] Inventor: Rodney D. Dunn, 15011 Crosswood Rd., La Mirada, Calif. 90638

[21] Appl. No.: 338,438

[22] Filed: Jan. 11, 1982

[51] Int. Cl.³ .......................................... F01K 23/10
[52] U.S. Cl. ...................................... 60/618; 60/321
[58] Field of Search ................ 60/321, 618; 123/41.21

[56] References Cited

U.S. PATENT DOCUMENTS

| | | | |
|---|---|---|---|
| 2,196,979 | 4/1940 | Campbell | 60/618 |
| 2,360,969 | 10/1944 | Newcombe | 60/618 |
| 2,737,014 | 3/1956 | Bush | 60/618 |
| 3,561,210 | 2/1971 | Wiseman | 60/321 |
| 3,948,235 | 4/1976 | Gamell | 60/618 |
| 4,300,353 | 11/1981 | Ridgway | 60/618 |

FOREIGN PATENT DOCUMENTS 2745995  4/1979  Fed. Rep. of Germany ........ 60/618

Primary Examiner—Douglas Hart
Attorney, Agent, or Firm—Edgar W. Averill, Jr.

[57] ABSTRACT

An improved internal combustion engine utilizing waste heat to generate steam. The engine has a closed chamber surrounding the exhaust manifold and water is injected within this chamber to generate steam which is passed to one or more cylinders to provide additional power.

7 Claims, 2 Drawing Figures

INTERNAL COMBUSTION ENGINE WITH STEAM POWER ASSIST

BACKGROUND OF THE DISCLOSURE

Numerous attempts have been made to utilize the vast amount of heat which is wasted in internal combustion engines and particularly in gasoline engines. The following U.S. patents show various approaches toward this desired end result:

U.S. Pat. Nos. 1,011,520; 1,189,103; 1,393,177; 1,373,509; 1,629,677; 2,196,979; 2,737,014; 2,919,540; 4,086,771; 4,235,077.

The Bush U.S. Pat. No. 2,737,014 placed a water reservoir around a series of coils, and the exhaust gasses were passed throgh the coils which heated up and eventually boiled the water in the reservoir. Similarly, the Killman U.S. Pat. No. 1,373,509 discloses a combined gas and steam engine where the boiler and radiator are combined. It is believed that this general concept disclosed in the these patents, that is utilizing waste heat to generate steam, is useful but the particular means in which the various devices utilize this waste heat is believed impractical and a better method is needed to utilize this heat so that automobiles and other vehicles can become more efficient.

SUMMARY OF THE INVENTION

It is thus an object of the present invention to provide a system for utilizing the waste heat of internal combustion engines to generate steam.

The present invention is for an improved internal combustion engine of the type having a plurality of cylinders containing pistons connected to a crankshaft for the combustion of an air fuel mixture. The engine has an exhaust manifold and a radiator, and the improvement comprises a closed chamber surrounding the exhaust manifold having means for injecting water on the outer surface of the manifold. The manifold is maintained at a temperature above the boiling point of water in the chamber so that the water is flashed into steam in the chamber. A steam cylinder is connected by a steam line to the closed chamber to convert the steam generated in the chamber to power and condenser means are connected to the steam cylinder to condense the steam after it has been exhausted from the steam cylinder. Preferably, the water is injected through an injector onto the manifold and temperature sensing means are provided to control the amount of water injected to maintain the manifold at a temperature above the boiling temperature of water in the chamber.

DESCRIPTION OF THE PREFERRED EMBODIMENTS

Figure 1:
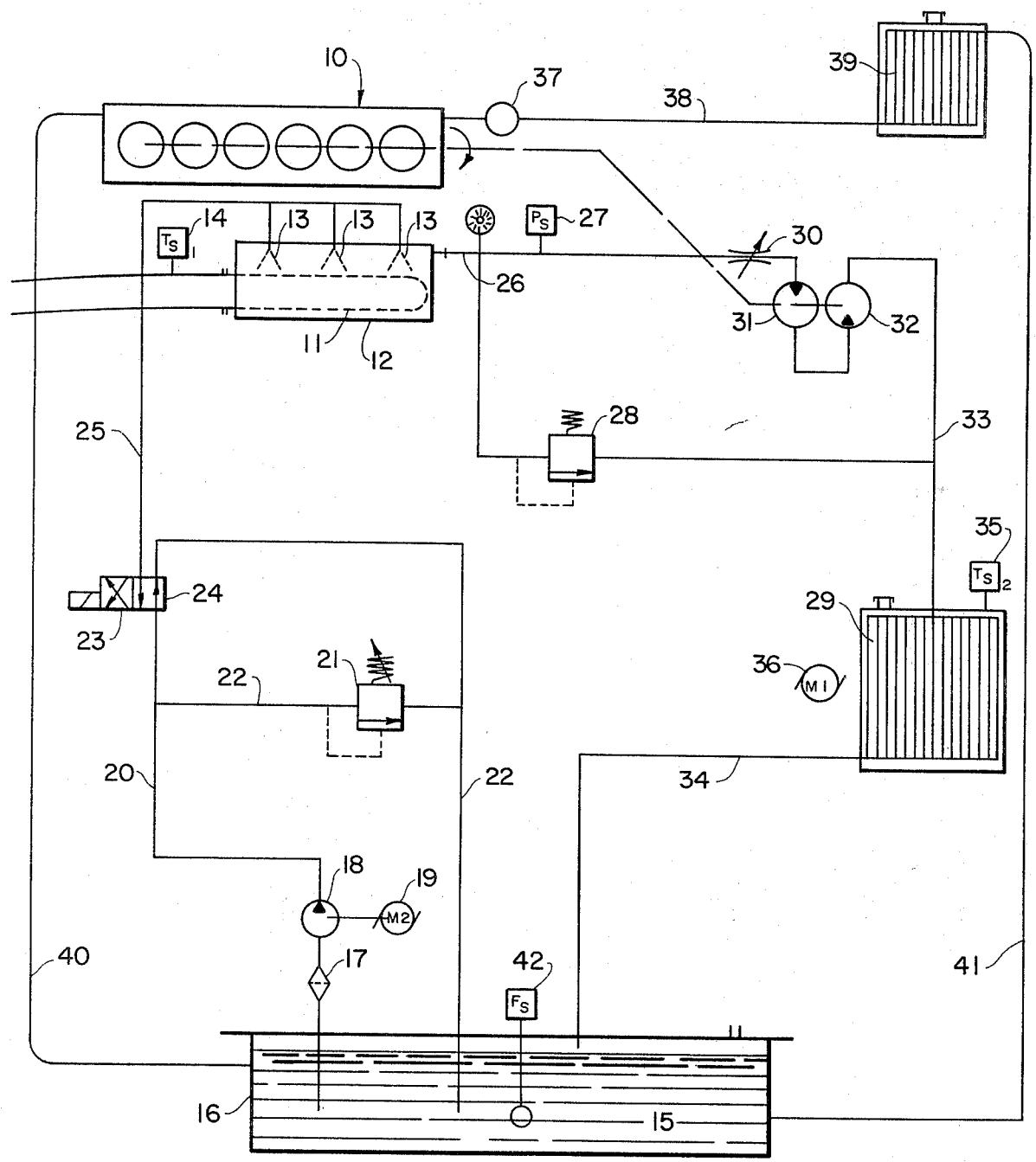
FIG. 1 is a schematic view of the engine and steam generating apparatus of the present invention.

A six-cylinder internal combustion engine 10 has an exhaust manifold 11 which is surrounded by a chamber 12. A plurality of water injectors 13 are positioned within chamber 12 and spray water onto the surface of manifold 11. A temperature sensor 14 is positioned in the exhaust manifold and water cannot be injected until the manifold temperature is high enough to vaporize the water.

Water 15 from reservoir 16 is pumped through a check valve 17 by way of a pump 18 driven by motor 19. Water circulates through pipe 20 and in order to prevent the pressure from becoming excessive, a pressure relief valve 21 is positioned in line 22 which serves as a return line to reservoir 16. A switch 23 is closed, opening valve 24 when the temperature sensor 14 indicates that the exhaust manifold has reached a temperature hot enough to flash or vaporize the water pumped through line 25 through injectors 13. The water, having passed through the injectors 13, is vaporized as it contacts exhaust manifold 11, and steam is formed in chamber 12 and passes outwardly from chamber 12 through line 26. A pressure switch 27 is in series with switch 23 and if the pressure becomes excessive, switch 23 is opened and no further water is provided to injectors 13. A pressure relief valve 28 prevents the pressure in line 26 from becoming excessive and passes steam to condenser 29 in the event that the pressure exceeds the set pressure of valve 28. Steam passes through servo throttle valve 30 to cylinders 31 and 32 which contain pistons which are connected to the crankshaft of internal combustion engine 10. The spent steam then passes through line 33 to condenser 29. The condensed steam is then passed to reservoir 16 through line 34. A temperature sensing switch 35 controls motor 36 which drives a fan to cool condenser 29.

Engine 10 contains the normal cooling passageways to prevent overheating and has a conventional water pump 37 which passes water through line 38 to radiator 39. The water in reservoir 16 is heated by internal combustion engine 10 and can be recirculated through the cooling system through lines 40 and 41.

The water level in reservoir 16 is controlled by a fluid sensor switch 42 and when the water level is low, a warning light 43 is turned on.

Figure 2:
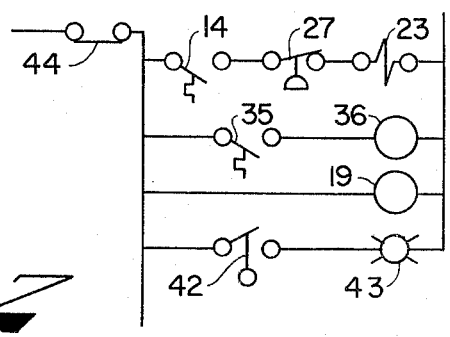
FIG. 2 is a schematic view of the control apparatus utilized to control the flow of water and steam in the device of FIG. 1.

As shown in FIG. 2, the control system is relatively simple. The ignition switch 44 provides voltage to the left half of the schematic as shown in FIG. 2. The switch 23 which opens valve 24 passes water to injectors 13 and is opened when temperature sensor switch 14 is closed by reaching a sufficient temperature and also when the pressure in chamber 12 is not sufficiently excessive to open pressure sensitive switch 27. The fan motor for the condenser 29 is turned on when the temperature in the condenser becomes excessive as sensed by temperature sensitive switch 35. The pump motor 19 which pumps water 15 from reservoir 16 is continually in operation as long as the ignition switch is turned one. The water level switch 42 turns on light 43 when the water level in reservoir 16 is low.

The effect of the above-described addition to the internal combustion engine is to utilize a substantial portion of the waste heat that is otherwise passed out of the exhaust. Exhaust manifold 11 as shown in the drawings is in effect a flash boiler, and the steam in chamber 12 is super heated, and no liquid water resides in chamber 12.

What is claimed is:

1. An improved internal combustion engine of the type having a plurality of cylinders containing pistons connected to a crankshaft for the combustion of an air/fuel mixture, said engine having an exhaust manifold and a radiator wherein the improvement comprises:

a closed chamber surrounding the exhaust manifold;

means for injecting water on the outer surface of the exhaust manifold in an amount insufficient to lower the manifold temperature below the boiling point of water at the pressure in the closed chamber so that steam is generated within the closed chamber;

at least one steam cylinder and piston connected by a steam line to the chamber to convert the steam generated in the chamber to power; and condenser means connected to the steam cylinder to condense the steam after it has been exhausted from the steam cylinder.

2. The engine of claim 1 wherein said means for injecting water comprises a water reservoir, an injector pump and at least one water injector.

3. The engine of claim 1 further including temperature sensing means on the exhaust manifold to enable the means for injecting water.

4. The engine of claim 2 further including heat transfer means whereby the water in the water reservoir is recirculated to the engine block to utilize the heat in the block.

5. The engine of claim 1 further including a second steam piston and cylinder.

6. The engine of claim 1 wherein the steam piston in the steam cylinder is connected to the crankshaft of the engine.

7. The engine of claim 5 wherein both of said steam pistons are connected to the crankshaft of the engine.

* * * * *